Patented Apr. 21, 1936

2,037,876

UNITED STATES PATENT OFFICE 2,037,876

PROCESS OF PREPARING HYDROAROMATIC ALCOHOLS

Euclid W. Bousquet, Wilmington, Del., assignor to E. I. du Pont de Nemours & Company, Wilmington, Del., a corporation of Delaware No Drawing. Application March 30, 1935, Serial No. 13,929

15 Claims. (Cl. 260—153)

This invention relates to catalytic hydrogenation processes, and more particularly to the catalytic hydrogenation of lactones of hydroxymethyl hydroaromatic carboxylic acids to cyclic alcohols and their derivatives. Specifically, it relates to the hydrogenation of hexahydrophthalide.

Up to the present time the catalytic hydrogenation of hydroaromatic lactones to yield the corresponding hydroaromatic alcohols and their derivatives has not been accomplished. Such alicyclic alcohols have been prepared only through the reduction by chemical means of diethyl hexahydrophthalate and even in these cases the yields of diols have been low. For example, Wieland and Langsdorff (Zeit. physiolog. Chem., 161, 74 (1926)) reduced diethyl hexahydrophthalate by means of sodium and alcohol and obtained 20% of reduction products (among which hexahydrophthalyl alcohol and hexahydrophthalyl ether were isolated), the remainder of the ester being saponified. Using a catalytic method, Adkins, Wojick and Covert (J. Am. Chem. Soc., 55, 1669 (1933)) hydrogenated diethyl hexahydrophthalate over copper-chromite and obtained up to 40% of hexahydrophthalyl alcohol, 70–94% of 2-methylcyclohexylcarbinol and 6% of hexahydro-ortho-xylene. Details of specific conditions required to give these various products are lacking. To my knowledge no one has produced hydroaromatic alcohols and their derivatives in the manner described herein.

This invention has as an object the provision of a practicable, economical and convenient process for the preparation of cyclic alcohols and their derivatives from hydroaromatic lactones. A further object is the preparation of hexahydrophthalyl alcohol. A still further object is the preparation of hexahydrophthalyl ether (octahydroisobenzofurane). A still further object is the preparation of hexahydro-o-tolyl carbinol (2-methyl-cyclohexylcarbinol). Other objects will appear hereinafter.

These objects are accomplished by the following invention, wherein the lactone of a hydroxymethyl hydroaromatic carboxylic acid such as hexahydrophthalide is brought into contact with hydrogen under suitable conditions of temperature and pressure in the presence of a non-ferrous metal hydrogenating catalyst.

Having outlined above the general purposes and plan of the invention, the following examples show in detail how the invention is to be carried out in practice. These examples are included for purposes of illustration and not of limitation.

Example 1

One hundred fifty-six grams of hexahydrophthalide and 13 grams of copper-chromite-barium catalyst were charged into an autoclave equipped with a mechanical agitator and hydrogen was introduced at 2600–3600 lbs. per square inch pressure. The autoclave was heated to 250° C. at which temperature the material was hydrogenated for seven hours. The product was removed from the autoclave, diluted with benzene to facilitate filtration, and the benzene solution was extracted rapidly with sodium carbonate solution to remove acidic substances which amounted to approximately 2% of the original material. The benzene was removed by evaporation and the residual oil was fractionated. There was thus obtained 65 grams of hexahydrophthalyl alcohol, 6 grams of hexahydrophthalyl ether and 10 grams of 2-methylcyclohexylcarbinol. 27 grams of hexahydrophthalide was recovered. The yield of hexahydrophthalyl alcohol based on hexahydrophthalide consumed was thus about 51% of the theoretical amount.

Example 2

Two hundred and fifty grams of hexahydrophthalide and 20 grams of copper-chromite catalyst were charged into an autoclave. The autoclave was vigorously agitated and heated at 250° C. at a hydrogen pressure of 3000 pounds per square inch for 8 hours. The reaction products were separated and isolated as described in Example 1, and there was obtained 80 grams of hexahydrophthalyl alcohol, 15 grams of hexahydrophthalyl ether, and 15 grams of 2-methyl-cyclohexylcarbinol. Eighty-five grams of hexahydrophthalide was recovered and the yield of hexahydrophthalyl alcohol based on hexahydrophthalide consumed was therefore 47% of the theoretical amount.

Although certain definite conditions of operation such as temperature and pressure have been indicated above, these factors may be varied within wide limits within the scope of this invention. The catalytic reduction of the hydroaromatic lactones requires the use of temperatures and pressures appreciably higher than customarily employed for other hydrogenation reactions. The temperatures may range from above 200° C. up to 500° C. The preferred temperature range is 240° C. to 400° C., depending somewhat on the catalyst composition selected and the method used for carrying out the given reaction. The success of the process also depends on the use of an elevated pressure in excess of 25 atmospheres, while the preferred pressure is about 50 to 250 atmospheres. The maximum pressure which can be used is limited only by the strength of the reaction apparatus. The invention is not limited to the use of these specific pressures, since they may be varied, depending upon the lactone treated and the amount of conversion desired. As the pressure is decreased, the conversion to alcohol decreases.

A batch or continuous method of operation may be utilized, but the batch process is preferred. In carrying out the hydrogenation of lactones in a continuous reaction system the rate at which the lactone may be pumped over the catalyst to obtain a given result is a function of the catalytic activity and also the molecular weight of the lactone. An active hydrogenating catalyst will ordinarily convert almost 8 times its volume of lactone per hour. Higher rates of flow of lactone may be employed but with slightly lower conversions. The optimum rate of flow may be determined by consideration of the economic balance between the yields of the different reaction products. The ratio of hydrogen to lactone used may also be varied over a wide range, but the use of an excess of hydrogen is preferred. Five to 10 moles of hydrogen per mole of ester is preferred for most conversions.

Whereas important factors in the hydrogenation of lactones are the use of high temperatures and high pressures, I have found that suitable catalysts may consist of a mild-acting hydrogenating metal or metal oxide. Catalysts found suitable for the hydrogenation of lactones are difficultly reducible hydrogenating oxides such as zinc and manganese oxides and reduced metals such as silver, copper, tin, cadmium, bismuth and lead, in which case it is advisable to employ a suitable supporting material such as silica, activated carbon, alumina, or a naturally occurring earth such as kieselguhr. Good results are obtained with a fused copper oxide, either wholly or partially reduced and oxides of the metals mentioned above may be used. Catalysts especially efficient in this process are those used in conjunction with promoters. It will be noted that the hydrogenating oxides are, in general, of a basic character. The promoting oxides are preferably chosen from the group consisting of the more acidic oxides of elements selected from the higher groups of the Periodic Table. For example, the oxides of chromium, vanadium, tungsten, titanium, and molybdenum are suitable promoters for the above oxides. Of these, chromium oxide is preferred, since it inhibits more the tendency towards catalyzing destructive side reactions. I have found it advantageous to use chromium oxide in physical admixture or in chemical combination, e. g., as a chromate or chromite, with a large number of oxides ordinarily regarded as easily reducible. The acidic promoting oxides other than chromium oxide may also be used either in physical admixture or in chemical combination, e. g., as tungstates, vanadates, molybdates, etc. The reducible oxides when combined or otherwise associated with chromium oxides are only partially reduced under conditions of operation and are found to be very effective catalysts for the hydrogenation of lactones. The oxides of silver, cadmium, copper, tin, bismuth and lead are all examples of oxides that may be employed in the more difficultly reducible form. Catalysts consisting of both reduced metals and non-reduced oxides are active even though the reaction is carried out at a temperature above the fusion point of the metal. Such mixed catalysts are conveniently employed initially in the form of chromates or chromites of the metals.

Special mention is made of the utility of catalysts containing copper oxide promoted by chromium oxide either in physical mixture or in chemical combination as copper chromate or copper chromite. This catalyst is particularly useful for liquid phase lactone hydrogenation reactions.

The advantages attending the use of difficultly reducible oxides or reducible oxides in a difficultly reducible form are several and substantial. These catalysts possess a high activity and are sturdy in character. They are relatively immune to degenerative processes such as sintering or poisoning, being thus distinguished from metal catalysts which deteriorate rapidly when subjected to excessive heating.

The catalysts described above, in addition to the modified copper-chromium catalysts last mentioned, may be modified or promoted by the addition of oxides or carbonates of alkali metals or of alkaline earth metals, or of basic compounds of alkali metals or of alkaline earth metals, that is, compounds of these alkali-forming metals with acids which are weaker than the metal hydroxide. Other suitable promoters are compounds containing an alkali or alkaline earth metal combined with the acid radical of an oxygen-containing acid, e. g., barium chromate. In particular I wish to mention the utility of catalysts containing copper chromate or chromite modified by the addition of barium chromate either in physical mixture or in chemical combination as copper chromium barium oxides.

Although it is usually preferable to carry out the hydrogenation in the absence of a solvent, the hydrogenation may be effected in the presence of solvents and the process is considered to be within the scope of this invention.

In place of hexahydrophthalide in the above examples, there may be used with similar results other lactones of hydroxymethyl hydroaromatic carboxylic acids of the general formula

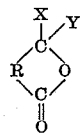

wherein R is any ortho or peri residue of a hydroaromatic compound, X is an alkyl group or hydrogen, and Y is an alkyl group or hydrogen which may or may not be the same as X. R may also be further substituted with alkyl or alkoxy groups as for example in the Ac-methyl, -ethyl and other Ac-alkyl substituted hydrophthalides and hydronaphthalides or for example in the corresponding Ac-alkoxy derivatives. There may also be used the nuclear-hydrogenated lactone of a hydroxymethyl carboxy diphenyl. As specific examples there may be mentioned the lactones obtained by the nuclear hydrogenation of 2-methylol-3-carboxynaphthalene, 1-methylol-8-carboxynaphthalene and 2-methylol-2'-carboxydiphenyl. Any of these lactones may be hydrogenated according to the process of this invention to give cyclic alcohols and their derivatives.

The present invention provides a novel, practical and economical method for obtaining hydroaromatic alcohols and their derivatives. These alcohols and their derivatives find application as plasticizers and perfumes and are also useful as intermediates for further synthesis in the preparation of resins and plasticizers.

The hydrogenation of hydroaromatic lactones as described in the present invention provides a process for the preparation of hydroaromatic alcohols and their derivatives, the convenience and economy of operation of which distinguish it from any process hitherto employed for the production of such cyclic alcohols.

The above description and examples are intended to be illustrative only. Any modification of or variation therefrom which conforms to the spirit of the invention is intended to be included within the scope of the claims.

I claim:

1. The process of preparing hydroaromatic alcohols which comprises bringing a lactone of a hydroxymethyl hydroaromatic carboxylic acid into contact with hydrogen in the presence of a hydrogenating catalyst at a temperature above 200° C. and at a pressure above 25 atmospheres.

2. The process in accordance with claim 1 characterized in that the catalyst is a non-ferrous metal hydrogenating catalyst.

3. The process in accordance with claim 1 characterized in that the catalyst is a copper-containing catalyst.

4. The process in accordance with claim 1 characterized in that the catalyst comprises essentially a copper oxide intimately associated with a chromium oxide.

5. The process in accordance with claim 1 characterized in that the catalyst comprises essentially a copper oxide intimately associated with a barium oxide and a chromium oxide.

6. The process in accordance with claim 1 characterized in that the catalyst comprises essentially a copper chromite.

7. The process in accordance with claim 1 characterized in that the catalyst comprises essentially a copper-barium chromite.

8. The process in accordance with claim 1 characterized in that the hydrogenation reaction is carried out at a temperature between 240° and 400° C.

9. The process in accordance with claim 1 characterized in that the hydrogenation reaction is carried out at a pressure between 50 and 250 atmospheres.

10. The process of preparing hydroaromatic alcohols which comprises bringing a lactone of a hydroxymethyl hydroaromatic carboxylic acid into contact with hydrogen in the presence of a copper-barium chromite catalyst at a temperature between 240° and 400° C. and at a pressure between 50 and 250 atmospheres.

11. The process in accordance with claim 1 characterized in that the lactone is hexahydrophthalide.

12. The process of preparing hydroaromatic alcohols which comprises bringing hexahydrophthalide into contact with hydrogen in the presence of a copper-containing catalyst at a temperature between 240° and 400° C. and under a pressure between 50 and 250 atmospheres.

13. The process of preparing hydroaromatic alcohols which comprises bringing hexahydrophthalide into contact with hydrogen in the presence of a copper chromite catalyst at a temperature between 240° and 400° C. and under a pressure between 50 and 250 atmospheres.

14. The process of preparing hydroaromatic alcohols which comprises bringing hexahydrophthalide into contact with hydrogen in the presence of a copper-barium chromite catalyst at a temperature between 240° and 400° C. and under a pressure between 50 and 250 atmospheres.

15. The process of preparing hydroaromatic alcohols which comprises bringing hexahydrophthalide into contact with hydrogen in the presence of a copper-barium chromite catalyst at a temperature of about 250° C. and at a pressure of about 2600 to 3600 pounds per square inch.

EUCLID W. BOUSQUET.